United States Patent [19]

Sheeler

[11] Patent Number: 5,268,139
[45] Date of Patent: Dec. 7, 1993

[54] METHOD OF MOLDING A PLASTIC WHEEL

[75] Inventor: Joseph W. Sheeler, Mechanicsburg, Pa.

[73] Assignee: Carlisle Tire & Rubber Company, Carlisle, Pa.

[21] Appl. No.: 926,354

[22] Filed: Aug. 6, 1992

[51] Int. Cl.$^5$ .............................................. B29C 45/26
[52] U.S. Cl. ............................ 264/328.8; 264/328.12
[58] Field of Search ............... 301/108.2, 108.3, 108.4, 301/64.7; 264/328.1, 328.8, 328.12, 257; 425/577, 468

[56] References Cited

U.S. PATENT DOCUMENTS

| 4,072,358 | 2/1978 | Ridha | 301/64.7 |
| 4,511,184 | 4/1985 | Schauf et al. | 264/328.12 |
| 4,540,534 | 9/1985 | Grendol | 264/328.12 |
| 5,112,551 | 5/1992 | Hylak et al. | 264/328.12 |

FOREIGN PATENT DOCUMENTS 60-124226  7/1985  Japan .................... 264/328.8

Primary Examiner—Jill L. Heitbrink
Attorney, Agent, or Firm—Wood, Herron & Evans

[57] ABSTRACT

Methods for molding plastic wheels which are substantially free of lines of weakness in the web thereof adjacent the lug apertures. The methods generally include orienting molding gates in a molding apparatus to a desired circumferential orientation and thereafter injection molding a fiber-reinforced molding composition such that radial orientation of the fibers and/or knit lines in the molding composition, both of which create lines of weakness, are not located in the regions of the web which are radially adjacent the lug apertures.

6 Claims, 1 Drawing Sheet

METHOD OF MOLDING A PLASTIC WHEEL

FIELD OF THE INVENTION

This invention relates to plastic wheels, and more particularly to methods of molding plastic wheels which are substantially free of weakness lines or fracture planes.

BACKGROUND OF THE INVENTION

Plastic wheels for vehicle tires and methods of injection molding those plastic wheels are known. Additionally, it is known to incorporate reinforcing fibers in the thermoplastic molding material to provide added strength to the molded wheels. However, several problems have been discovered in molding fiber-reinforced plastic wheels for vehicle tires. Typically, plastic wheels have lug apertures for receiving lug bolts or threaded lug studs and nuts to secure the wheel to a hub. The wheels also typically have a central hub aperture about which the lug apertures are circumferentially spaced. The radial spacing between each lug aperture and the hub aperture is such that weak areas are created in the web of the wheel. Thus, when the lug nuts are torqued or tightened in the lug apertures, the pressure tends to fracture the area inwardly radially adjacent to the lug apertures, rendering the entire plastic wheel unsuitable for use in mounting a tire to a vehicle hub.

The fracturing of the weakened regions inwardly radially adjacent to the lug apertures is believed to occur for essentially one of two reasons. First, the molding composition, which contains the reinforcing fibers, is injected into a wheel mold through circumferential gates in the injection molding apparatus, specifically a center molding form which defines the hub aperture. When the molding gates are radially aligned with the locations where the lug apertures are formed in the wheel web, at least a portion of the fibers in the molding composition flowing through the gates into the mold tend to orient radially in the wheel web region formed between the lug apertures and hub aperture. This radial orientation of fibers creates a line of weakness or fracture plane in the area inwardly radially adjacent to each of the lug apertures. Thus, when the lug nuts are tightened or torqued in the lug aperture, the plastic surrounding the lug aperture at the gate position may be more easily fractured.

Alternatively, when each molding gate is circumferentially aligned approximately halfway between the locations where two adjacent lug apertures are formed in the web, the molding composition flows through the gates and the fibers orient generally circumferentially. However, this results in "knit" lines forming at the points where the material injected from adjacent gates flows together. These "knit" lines represent undesirable lines of weakness or fracture planes in the plastic and, therefore, when these lines are formed in the web radially adjacent to the lug apertures, the plastic in these areas is subject to fracture upon tightening the lug nuts.

Therefore, a clear need exists for a method of molding plastic wheels which are substantially free of lines of weakness/fracture planes so as to reduce the susceptibility of the wheel to fracture in the areas radially adjacent to the lug apertures.

SUMMARY OF THE INVENTION

This invention relates generally to a method of molding plastic wheels, and more particularly to a method of molding fiber-reinforced plastic wheels which have a web, a center hub aperture, and a plurality of circumferentially spaced lug apertures radially adjacent to the central hub aperture. The molded plastic wheels are substantially free of lines of weakness or fracture planes at locations radially adjacent to the lug apertures to thereby substantially prevent fractures at these locations.

In one form of the method of the present invention, the first step in molding the plastic wheel is to circumferentially align in a mold for a plastic wheel a center molding form which defines the center hub locator aperture. The molding form has a plurality of molding gates about its circumference. The molding gates are aligned so that the gates are not radially adjacent to the lug apertures formed in the web of the plastic wheel. Further, the molding gates are aligned so that the knit lines formed when the wheel has been molded are not located radially adjacent to the lug apertures in the web. The second step of the method for molding the plastic wheel is to inject a thermoplastic molding composition containing reinforcing fibers through the molding gates into the mold for the plastic wheel.

In the method of the present invention, it is preferred that the plurality of molding gates in the center molding form is equal to the number of radially adjacent lug apertures in the plastic wheel. Additionally, the center molding form preferably has four molding gates circumferentially spaced approximately 90° apart and the plastic wheel, when molded, has four lug apertures circumferentially spaced approximately 90° apart.

In the most preferred form of the method of invention, the first step in molding the plastic wheel is to circumferentially align in a mold for a plastic wheel a center molding form which defines the center hub aperture. The molding form has four molding gates about its circumference. The molding gates are circumferentially spaced approximately 90° apart and are aligned so that each gate is circumferentially spaced approximately 22.5° plus or minus 10° from the center of a lug aperture. Moreover, the number of molding gates in the center molding form is equal to the number of radially adjacent lug apertures formed in the plastic wheel. In the second step of the preferred form of the method, the fiber-reinforced thermoplastic molding composition is injected through the gates into the mold to produce the molded thermoplastic wheel at a temperature of approximately 550° F,. and a pressure of approximately 25,000 psi.

This invention and the advantages thereof will be more clearly apparent from a consideration of the drawings and is more fully described in the following detailed description of the invention. However, it is understood that such detailed description is not to be taken in a limiting sense and is only illustrative of a preferred embodiment of the present invention.

BRIEF DESCRIPTION OF THE DRAWINGS

Figure 1:
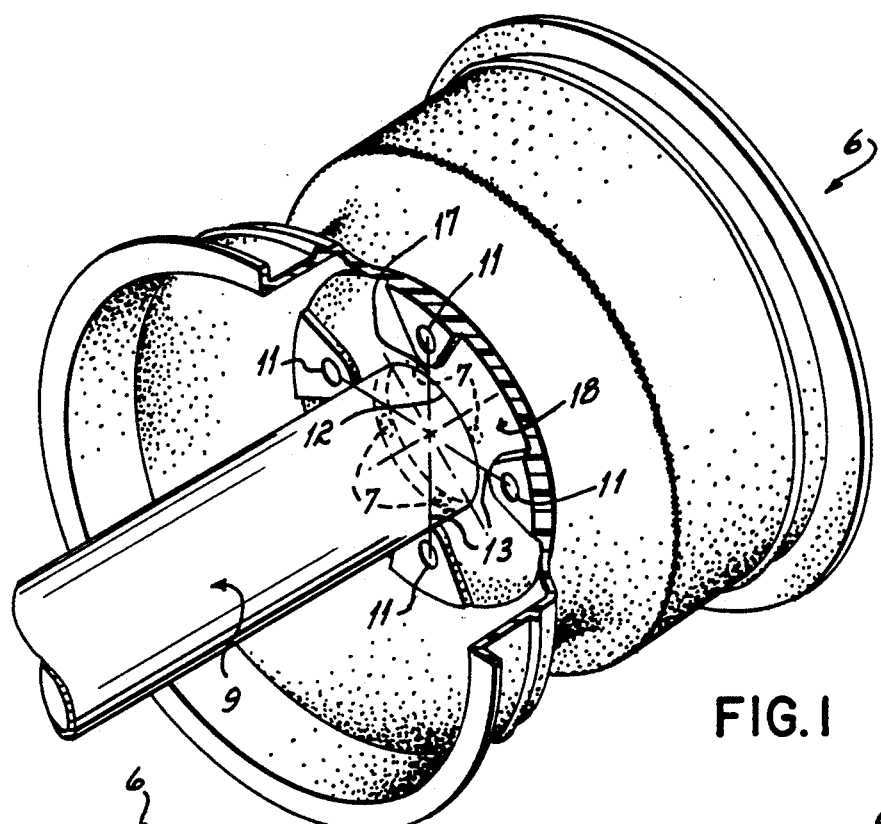
Figure 2:
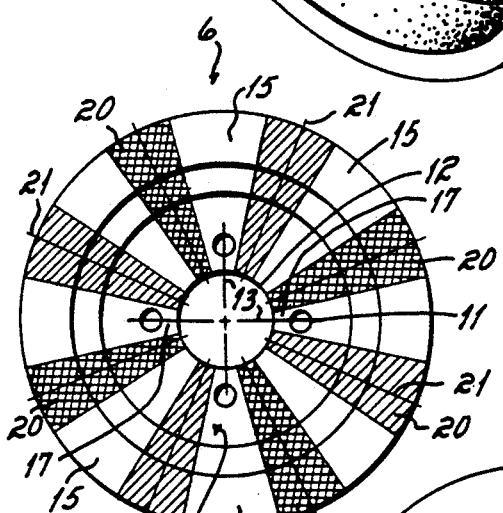

Having thus described the invention in general terms, reference will now be made to the accompanying drawings in which:

FIG. 1 is a fragmented perspective view of a plastic wheel illustrating the gating positions for injecting the molding composition into a mold;

FIG. 2 is a diagrammatic plan view of a plastic wheel of the present invention illustrating preferred ranges or regions of gating positions for injecting the molding composition into a mold.

Figure 3:
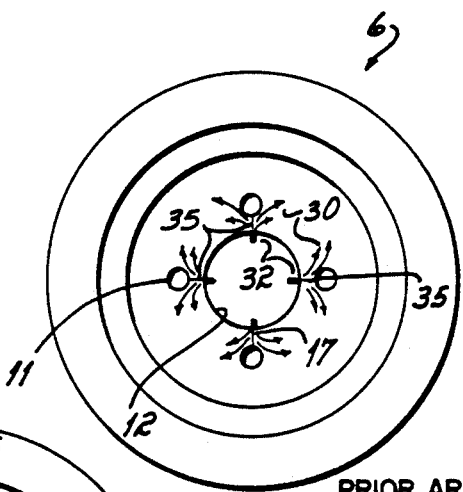

FIG. 3 is a diagrammatic plan view of a plastic wheel illustrating gating positions radially adjacent to the lug apertures of the wheel and showing the lines of flow of the molding material.

Figure 4:
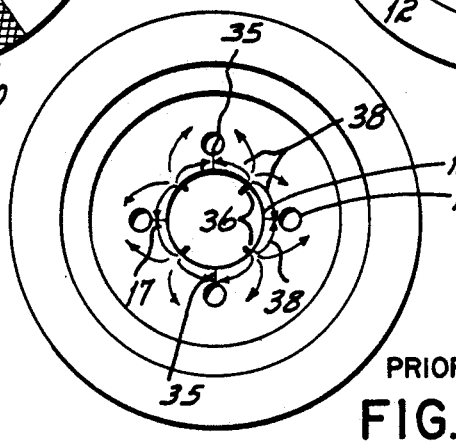

FIG. 4 is a diagrammatic plan view of a plastic wheel illustrating gating positions where knit lines form radially adjacent to the lug apertures of a wheel and showing the lines of flow of the molding material.

DETAILED DESCRIPTION OF THE PRESENT INVENTION

In describing the invention reference will be made to the embodiments of the invention selected for the purpose of illustration and specific language will be used to describe the several elements thereof. It will nevertheless be understood that no limitation of the invention is thereby intended but that various modifications of the method are contemplated.

Generally, the molding method of the present invention provides for molding a fiber-reinforced plastic wheel in a mold. More particularly, the method incorporates conventional molding techniques whereby a molding composition containing fibers is injected through an injection molding apparatus having gates into the wheel mold having a separable shell and core for defining the molded wheel. The molding composition takes the form of the space within the mold to form the wheel.

Referring now in more detail to the drawings, FIG. 1 illustrates a fragmented perspective view of a wheel 6 of the present invention and an injecting apparatus 9 having circumferentially spaced molding gates 7. Pins (not shown) which are part of known molding apparatus and used in known techniques, form mounting apertures or lug apertures 11 of wheel 6 when a molding composition is injected into a conventional mold (not shown) through the molding gates 7. The molding gates 7 for injecting the molding composition for wheel 6 are located in injecting apparatus 9 which defines a center hub aperture 12 in wheel 6. Also, gates 7 are circumferentially aligned in molding apparatus 9 so that their positions are not radially adjacent to lug apertures 11 (as they are shown in FIG. 3). This positioning prevents radial fiber orientation and subsequent fracture of the web in the regions radially adjacent to each lug aperture. Further, gates 7 are not positioned 45° from lug apertures 11 (as they are shown in FIG. 4), lug apertures 11 being located at the 0° and 90° positions. By not positioning the gates at the 45° locations, knit lines are not formed radially adjacent lug apertures 11 when the molding composition is injected through molding gates 7.

Referring now to FIG. 2 of the drawings which is a diagrammatic plan view of the wheel 6, shaded regions 20 define the locations of preferred circumferential positioning of the gates 7 in the method of the present invention. Regions 20 are divided into two distinct groups, which alternate one on either side of each aperture 11. Four regions are shaded with cross-hatching and four alternative regions are shaded with diagonal lines only. The cross-hatch shaded regions and the diagonal line shaded regions are illustrative of the respective approximate circumferential position of each of the four gates (four per group) after alignment of the gates in accordance with one aspect of the present invention. The shaded regions each have a centerline 21 and molding gates located adjacent each shaded region are aligned an equal distance apart from each other, i.e., approximately 90°, and are preferably aligned at least approximately 22.5° from the center of the nearest radially adjacent aperture 11. By circumferentially orienting each gate 7 outside of a zone 15 and in a zone 20, the knit lines and radial flow lines of the fiber material will not form radially adjacent a lug aperture, thereby substantially preventing fracturing of thin portions 17 of wheel 6. As shown for illustrative purposes, the adjacent centerlines 13 of lug apertures 11 are located at 0°, 90°, 180° and 270°.

In one embodiment of the present invention, the four gates 7 are circumferentially aligned to be about 22.5° from an aperture centerline and thus are positioned at the 22.5°, 112.5°, 202.5° and 292.5° locations, i.e., in the diagonal line shaded regions, in a mold for a plastic wheel. Thus, when a molding composition is injected into the mold through the molding gates, the plastic wheel produced does not have knit lines or fracture planes in the areas 17 of wheel 6 radially adjacent to lug apertures 11.

In another embodiment of the present invention, the four gates are each aligned about 22.5° from an aperture centerline and are positioned at the 67.5°, 157.5°, 247.5° and 337.5° location, i.e., in the cross-hatch shaded regions, in a mold for a plastic wheel. Thus, when a molding composition is injected into the mold through the molding gates, the plastic wheel produced does not have knit lines or fracture planes in the areas 17 of wheel 6 radially adjacent to lug apertures 11.

It will be appreciated that the shaded regions each encompass a region that has a centerline 21 that is 22.5° from a lug aperture centerline 13, and the shaded region extends plus or minus 10° from the centerline thereof. The gates can be aligned anywhere within the shaded regions and the goals of the present invention will be accomplished since no knit lines or fracture planes will be formed in the regions 17 radially adjacent the lug apertures 11.

Although not critical to the practice of the present invention, the molding composition may be a mixture of glass fiber ranging in length from powder to 0.25" in a resin, such as polyamide resin. This composition is injected through the molding gates in accordance with known injection molding techniques, for example at a temperature of approximately 550° F. and a pressure of approximately 25,000 psi.

Referring now to FIG. 3 of the drawings, arrows 30 illustrate the flow of the molding composition when the four gate positions 32 are located at points radially adjacent to the lug apertures 11, i.e., 0°, 90°, 180° and 270. The flow 30 of the composition creates a radial alignment of the fibers contained in the composition at points 35 radially adjacent to lug apertures 11. This radial alignment of the fibers at these locations results in lines of weakness which may cause the wheel to fracture at this location upon torquing a lug nut in lug aperture 11. This is avoided in the method of the present invention.

Referring now to FIG. 4 of the drawings, arrows 38 illustrate the flow of the molding composition when the four gate positions 36 are located each at a point halfway between lug aperture 11 centerline 13, i.e., 45°, 135°, 225° and 315°. The flow 38 of the composition creates knit lines in the composition at points 35 which are radially adjacent to lug apertures 11 due to converging flow from adjacent gates. The knit lines provide lines of weakness which may result in fracture of the wheel at lines 35 upon lug apertures 11. This is avoided in the method of the present invention.

Thus, there has been illustrated and described a unique and novel method for molding a plastic wheel for securing to the hub of a vehicle which utilizes an alignment of the molding gates before injecting a molding composition containing fibers into a mold for a wheel. The method substantially eliminates the fracture of the wheel web when the wheel is mounted and secured to a vehicle hub. Thus, the present invention fulfills all the objects and advantages which have been sought heretofore. It should be understood that changes and modifications, variations, and other uses and applications will become apparent to those skilled in the art after considering the specification and the accompanying drawings. Therefore, any and all changes, modifications, variations, and other uses and applications which do not depart from the spirit and scope of the invention are deemed to be covered by the invention which is limited only by the following claims.

What is claimed is:

1. A method of molding a fiber-reinforced plastic wheel having a web, a plurality of lug apertures and a center hub aperture in said web, wherein said molded plastic wheel is substantially free of knit lines and lines of weakness at locations radially adjacent to said lug apertures, said method comprising the steps of:

circumferentially aligning in a mold for a plastic wheel a center molding form which defines said center hub aperture and which has a plurality of molding gates about its circumference, said molding gates aligned so that they are not radially adjacent to the locations where said lug apertures are formed in said web of said plastic wheel, and so that knit lines and lines of weakness formed in said molded plastic wheel are not located radially adjacent to said lug apertures; and injecting a thermoplastic molding composition containing reinforcing fibers through said molding gates in said center molding form into the wheel mold to mold a plastic wheel which is substantially free of knit lines and lines of weakness at locations radially adjacent to said lug apertures, wherein the lines of weakness and knit lines caused by the injecting are not located radially adjacent to said lug apertures.

2. A method of claim 1 wherein said plurality of molding gates is equal to the number of lug apertures in said wheel.

3. A method of claim 2 wherein said center molding form has four molding gates circumferentially spaced approximately 90° apart and said plastic wheel has four lug apertures circumferentially spaced approximately 90° apart.

4. A method of claim 3 wherein said molding gates are circumferentially aligned such that each gate is approximately 22.5° plus or minus 10° from the centerline of a lug aperture.

5. A method of claim 1 wherein said fiber reinforced thermoplastic molding composition contains fibers ranging from powder length to approximately 0.25".

6. A method of claim 1 wherein said fiber reinforced thermoplastic molding composition is injected into said mold at a temperature of approximately 550° and at a pressure of approximately 25,000 psi.

* * * * *